US011977688B2

(12) United States Patent
Purvis et al.

(10) Patent No.: US 11,977,688 B2
(45) Date of Patent: May 7, 2024

(54) USER-SELECTABLE TOOL FOR AN OPTICAL TRACKING VIRTUAL REALITY SYSTEM

(71) Applicant: DREAMSCAPE IMMERSIVE, INC., Culver City, CA (US)

(72) Inventors: Christopher Purvis, Los Angeles, CA (US); Michael Fusco, Alhambra, CA (US)

(73) Assignee: DREAMSCAPE IMMERSIVE, INC., Culver City, CA (US)

( * ) Notice: Subject to any disclaimer, the term of this patent is extended or adjusted under 35 U.S.C. 154(b) by 0 days.

(21) Appl. No.: 17/053,309

(22) PCT Filed: May 8, 2019

(86) PCT No.: PCT/IB2019/053793
§ 371 (c)(1),
(2) Date: Nov. 5, 2020

(87) PCT Pub. No.: WO2019/215646
PCT Pub. Date: Nov. 14, 2019

(65) Prior Publication Data
US 2021/0072841 A1 Mar. 11, 2021

Related U.S. Application Data

(60) Provisional application No. 62/669,224, filed on May 9, 2018.

(51) Int. Cl.
*A63F 13/213* (2014.01)
*A63F 13/26* (2014.01)
(Continued)

(52) U.S. Cl.
CPC .......... *G06F 3/0308* (2013.01); *A63F 13/213* (2014.09); *A63F 13/26* (2014.09); *G06F 3/02* (2013.01); *A63F 2300/8082* (2013.01)

(58) Field of Classification Search
CPC ........ G06F 3/0308; G06F 3/02; G06F 3/0325; G06F 3/011; G06F 3/04815;
(Continued)

(56) References Cited

U.S. PATENT DOCUMENTS 5,856,844 A * 1/1999 Batterman ............. G09B 9/307
345/158
6,417,836 B1 * 7/2002 Kumar .................. G06F 3/0325
345/157
(Continued)

FOREIGN PATENT DOCUMENTS

CN 1802586 7/2006
JP 2012-166036 A 9/2012
(Continued)

OTHER PUBLICATIONS

Notification of Transmittal of the International Search Report and the Written Opinion of the International Searching Authority, or the Declaration (dated Oct. 4, 2019; 14 pages).
(Continued)

*Primary Examiner* — Temesghen Ghebretinsae
*Assistant Examiner* — Karin Kiyabu
(74) *Attorney, Agent, or Firm* — Womble Bond Dickinson (US) LLP

(57) ABSTRACT

A virtual reality system (100) and device for use therein involve an optical detection arrangement (200) configured to detect a light pattern associated with a unique identity, and a tool (300) having a plurality of light-emitting devices (600) engaged therewith. The light-emitting devices (600) are selectively user-actuatable between a plurality of light patterns detectable by the optical detection arrangement (200). The light patterns provide a plurality of unique identities of the tool (300) as detected by the optical detection arrangement (200).

12 Claims, 4 Drawing Sheets

Figure 2A:
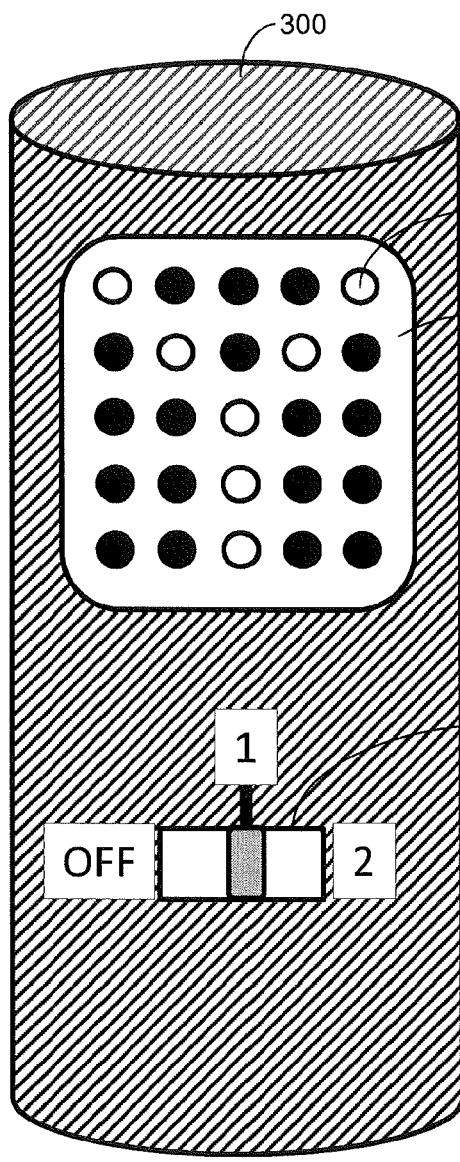

(51) Int. Cl.
*G06F 3/02* (2006.01)
*G06F 3/03* (2006.01)

(58) Field of Classification Search
CPC .................. A63F 13/213; A63F 13/26; A63F 2300/8082; A63F 13/212; A63F 13/25; A63F 13/5255; A63F 13/219; A63F 13/428; A63F 13/211
See application file for complete search history.

(56) References Cited

U.S. PATENT DOCUMENTS

| | | | | |
|---|---|---|---|---|
| 6,746,124 | B2* | 6/2004 | Fischer | F21V 14/065 362/187 |
| 7,261,438 | B2* | 8/2007 | Alessio | F21V 14/06 362/268 |
| 8,287,373 | B2* | 10/2012 | Marks | A63F 13/211 715/702 |
| 9,075,455 | B2* | 7/2015 | Masselli | G06F 3/0346 |
| 10,587,834 | B2* | 3/2020 | Goslin | H04N 5/44504 |
| 11,351,472 | B2* | 6/2022 | Goslin | A63H 33/009 |
| 2006/0152434 | A1 | 7/2006 | Sauer et al. | |
| 2006/0277571 | A1* | 12/2006 | Marks | A63F 13/42 725/37 |
| 2009/0096714 | A1* | 4/2009 | Yamada | G06F 3/04812 345/8 |
| 2012/0142415 | A1* | 6/2012 | Lindsay | G06T 19/006 463/33 |
| 2012/0156652 | A1 | 6/2012 | Lane et al. | |
| 2016/0232715 | A1* | 8/2016 | Lee | G06F 3/011 |
| 2017/0354864 | A1 | 12/2017 | Rogers et al. | |
| 2019/0179426 | A1 | 6/2019 | Ojala | |

FOREIGN PATENT DOCUMENTS

| | | | | |
|---|---|---|---|---|
| JP | 2012166036 A | * | 9/2012 | ............ A63F 13/06 |
| TW | 201222424 | | 6/2012 | |
| WO | WO 2018/035362 A1 | | 2/2018 | |

OTHER PUBLICATIONS

Office Action issued in corresponding Japanese Patent Application No. 2021-513019, dated May 16, 2023.

* cited by examiner

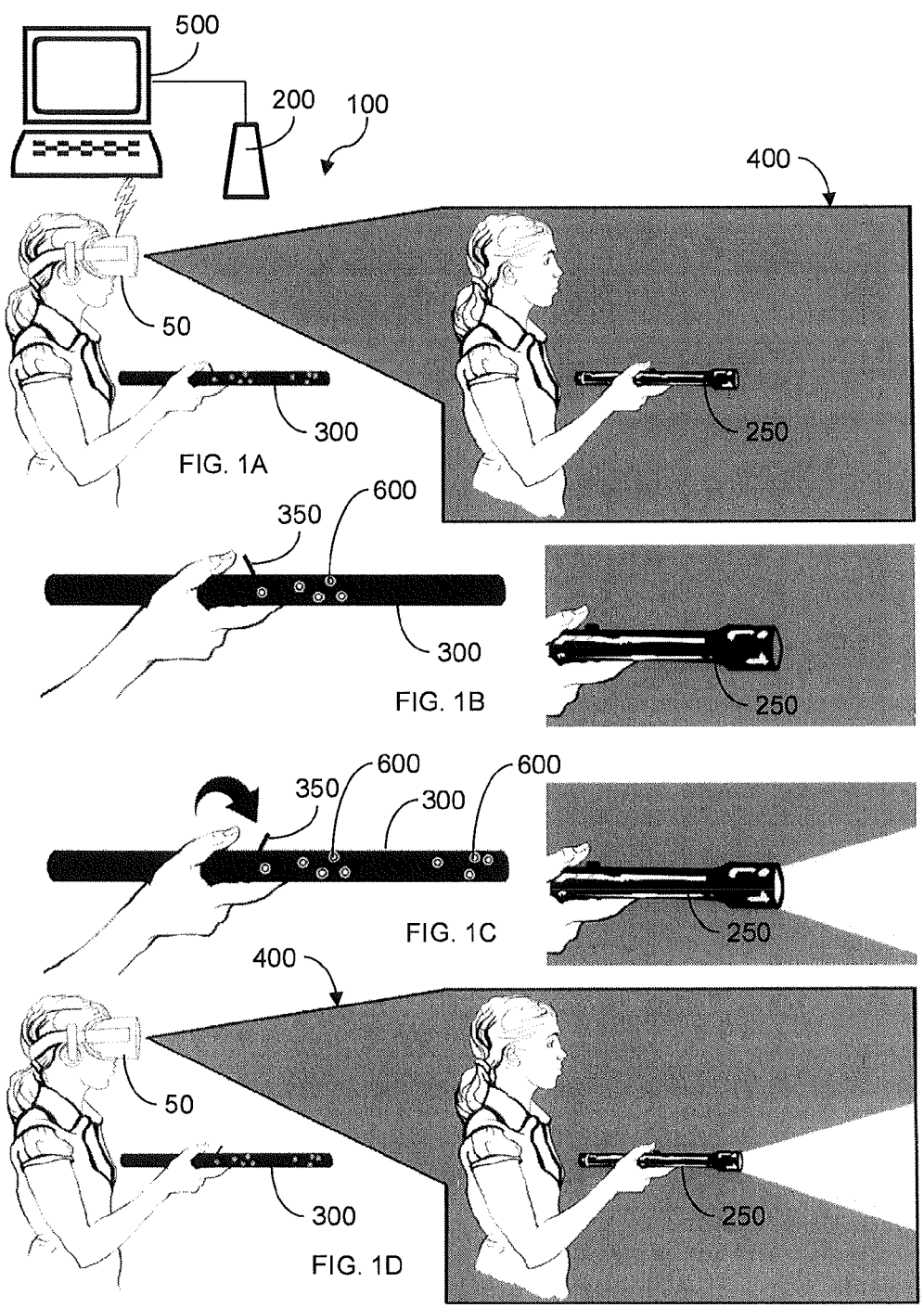

USER-SELECTABLE TOOL FOR AN OPTICAL TRACKING VIRTUAL REALITY SYSTEM

CROSS-REFERENCE TO RELATED APPLICATIONS

This application is a national stage filing under 35 U.S.C. 371 of PCT/IB2019/053793 filed May 8, 2019, which International Application was published by the International Bureau in English on Nov. 14, 2019, which claims priority to U.S. Provisional Application No. 62/669,224, filed on May 9, 2018, which are both hereby incorporated herein in their entirety by reference.

BACKGROUND

Field of the Disclosure

Aspects of the present disclosure are directed to virtual reality systems and, more particularly, to a user-selectable tool for use in an optical tracking virtual reality system and a virtual reality system implementing such a tool.

Description of Related Art

Virtual reality experiences often employ physical props to heighten the level of immersion experienced by the user. Because all virtual implements represented in the virtual reality environment are rendered by a computer, simple, non-specific physical props can be made to represent much more complex and varied virtual implements in the virtual reality environment in a compelling manner. For example, a simple physical cardboard tube, wooden dowel, or stick can appear in virtual reality to be any number of similarly-shaped objects such as a functioning illuminated flashlight, a burning torch, a baseball bat, or a metal crowbar. To the virtual reality user, the simple stick can convincingly be all these things and more. However, to be represented correctly to the user in a virtual reality environment, any included props that are represented as a virtual object in the virtual reality environment need to be tracked in the physical environment.

In a typical virtual reality installation, a tracking system streams the position and orientation of every tracked object to a simulation process so that the virtual representations of the tracked objects can be correctly rendered as part of the virtual reality environment. In a simple form, such a tracking system follows the position and orientation of the head-mounted display (see, e.g., element 50 in FIGS. 1A and 1D) being worn by the user so that the viewpoint of the user in the virtual reality environment can be rendered correctly on the display screens of the head-mounted display. More complex systems include tracking of secondary and tertiary objects, allowing the user or multiple users to experience more complex virtual reality environments. One method of tracking physical objects in virtual reality systems is the use of optical cameras to track the physical objects. The physical props can be imaged by the cameras arrayed around the physical installation (e.g., stage). The images captured by the cameras facilitate the determination of the position and orientation of each physical object or prop by comparing the view of the object as seen by all cameras having the physical object in view (e.g., by triangulation).

To further increase the level of immersion and utility provided by physical props in a virtual environment, it may be useful for a single physical prop to be switchable between different operational states (e.g., turning a flashlight on or off) or between different types or configurations (e.g., from a lit flashlight to a burning torch). However, adding a physical switch, button, or other switchable device to the physical prop may create additional integration challenges for the virtual reality system designer. That is, because of the state of the art in body and object tracking technology in virtual reality installations, detecting the action of engaging or disengaging a switch is difficult. The motion required to actuate a switch is often too miniscule to be accurately detected by optical-based virtual reality tracking systems. Employing a wired or wireless link between the switch and the computer device running the virtual reality simulation may be a solution to this problem, but either of these solutions has limitations.

More particularly, for example, a transmitter device may be connected between the physical prop and the simulation computer for the virtual reality system via wireline, or wirelessly via WiFi or Bluetooth. While this solution is viable from a technical standpoint, it creates several production and operational difficulties. For instance, a transmitter would be required to be incorporated into the physical prop adds complexity and cost to the prop, as well as increasing the electrical power requirements integrated into the prop. The transmitter would also require some level of programming and communication configuration. From the tracking perspective, a receiver for the radio signal from the transmitter would be required, which would also require some level of programming and communication configuration, particularly if the receiver must discern between many such radio signals involved in the virtual reality arrangement. That is, when adding more than one prop to a virtual reality environment, wherein all props are to be tracked by a wireless communication transmitter/receiver arrangement, the issue of communication pairing and efficiency may become difficult and complex, particularly when substituting a replacement prop for a prop integrated into the system for which the wireless communication system has malfunctioned.

Thus, it would be desirable to have a simple physical prop for use in a virtual reality environment and experience that incorporates a switchable device, wherein user-actuation of the switchable device can be detected reliably by the virtual reality simulation system, and wherein the physical prop itself does not require any data transmission or other type of communication connection or pairing with a radio signal receiving device. It would also be desirable for this physical prop having a switchable device to leverage existing tracking systems already implemented in virtual reality experiences and, once such a physical prop is appropriately configured and integrated into the tracking system, no further configuration of the prop, or re-configuration in the event that a replacement prop is needed, is required for the tracking system to function as intended.

BRIEF SUMMARY OF THE DISCLOSURE

The above and other needs are met by the present disclosure which, in one aspect, provides a virtual reality system, comprising an optical detection arrangement configured to detect a light pattern associated with a unique identity. A tool has a plurality of light-emitting devices engaged therewith, wherein the light-emitting devices are selectively user-actuatable between a plurality of light patterns detectable by the optical detection arrangement, and wherein the light patterns provide a plurality of unique identities of the tool as detected by the optical detection arrangement.

Another aspect of the disclosure provides a device for use in a virtual reality system, comprising a tool, and a plurality of light-emitting devices engaged with the tool. The light-emitting devices are selectively user-actuatable between a plurality of light patterns each associated with a unique identity and are adapted to be detected by an optical detection arrangement, wherein the light patterns provide a plurality of unique identities associated with the tool as detected by the optical detection arrangement.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific aspect description or claim herein. This disclosure is intended to be read holistically such that any separable features or elements of the disclosure, in any of its aspects, should be viewed as intended to be combinable, unless the context of the disclosure clearly dictates otherwise.

BRIEF DESCRIPTION OF THE SEVERAL VIEWS OF THE DRAWING(S)

Figure 2B:
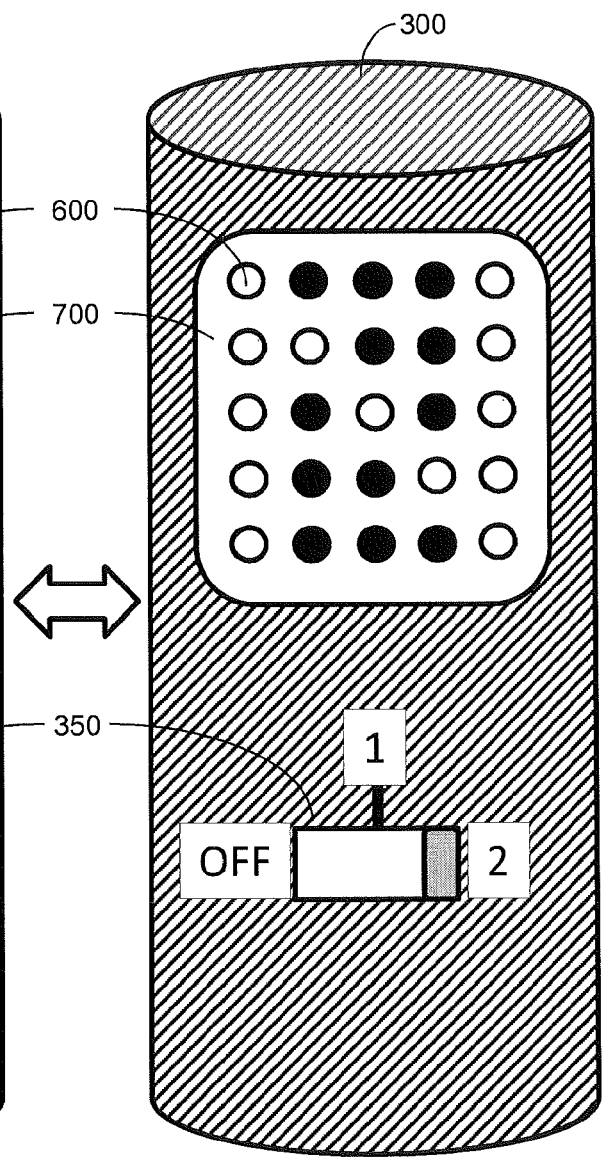
Figure 3A:
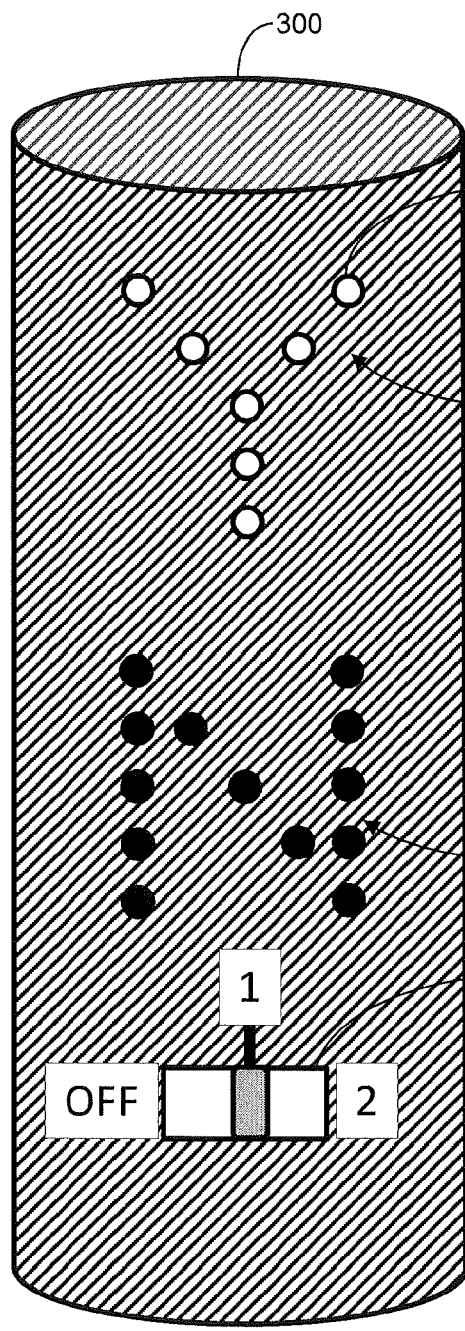
Figure 3B:
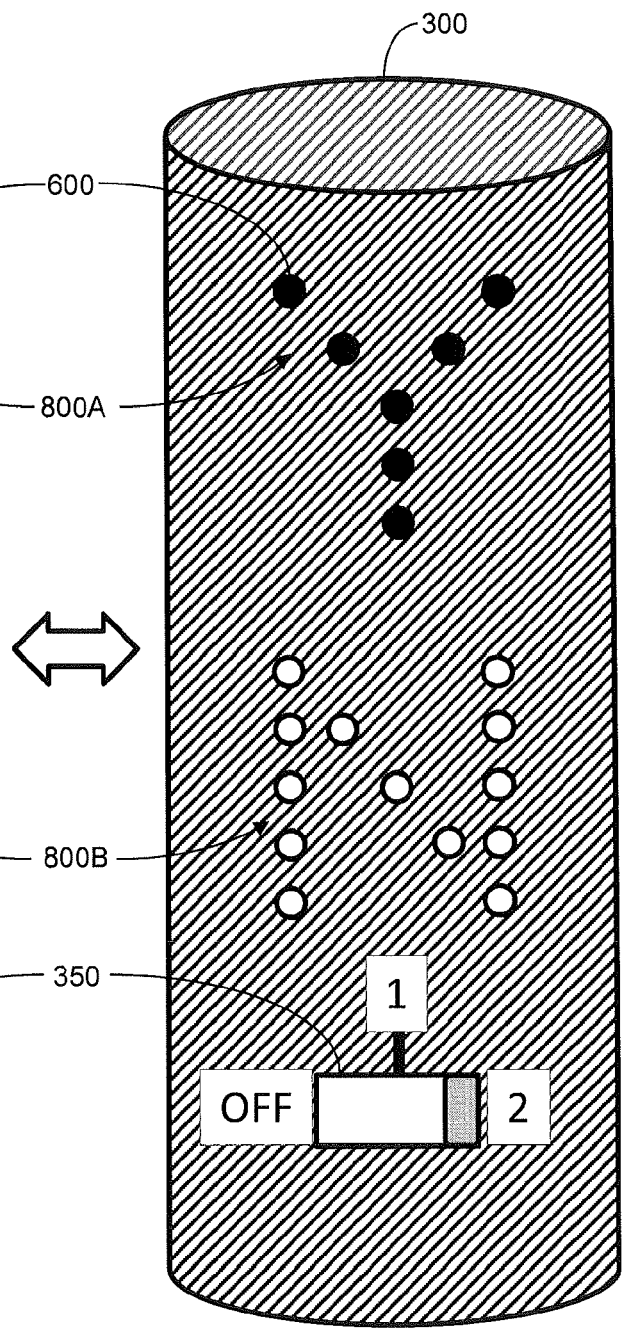
Figure 4A:
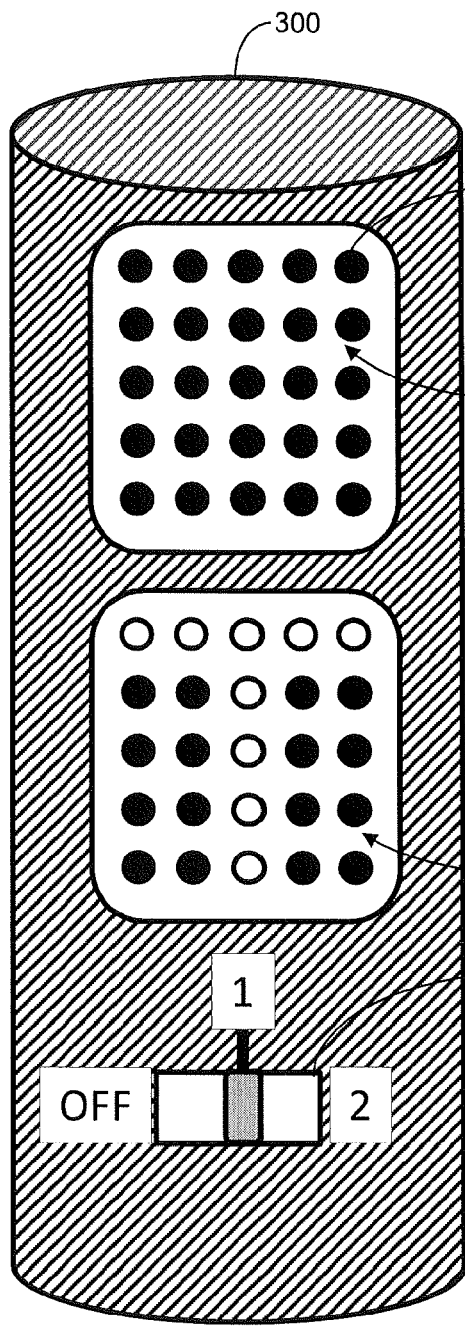
Figure 4B:
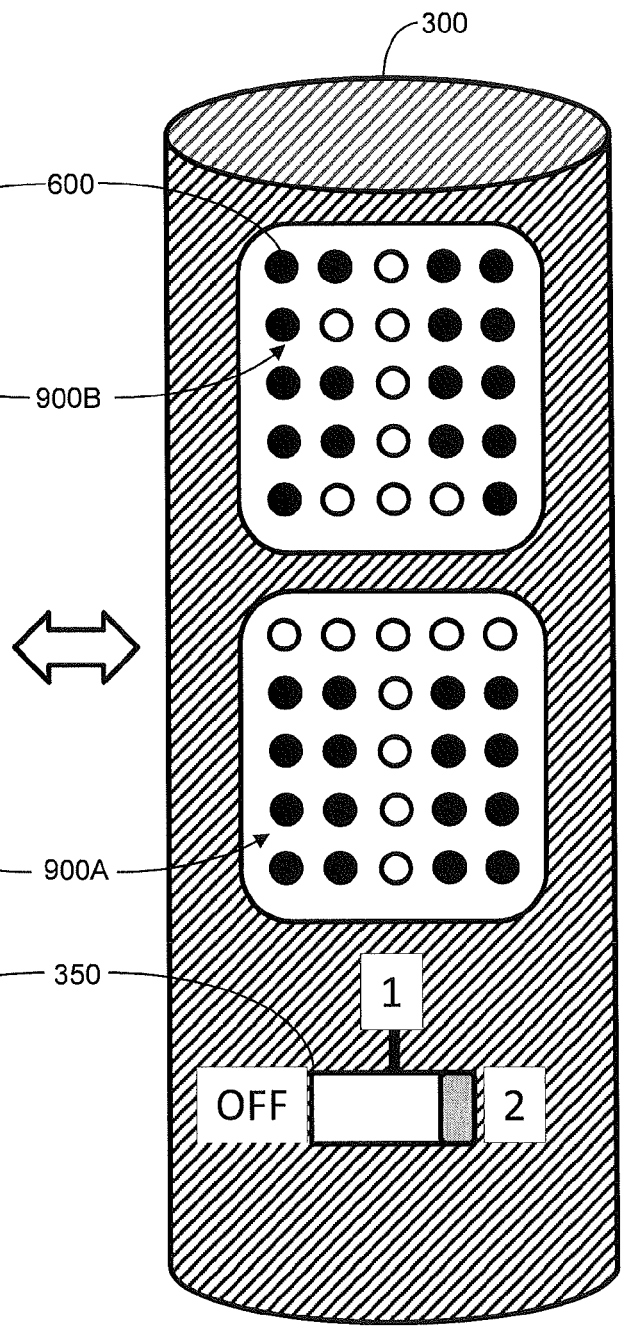

Having thus described the disclosure in general terms, reference will now be made to the accompanying drawings, which are not necessarily drawn to scale, and wherein:

FIGS. 1A-1D schematically illustrates a virtual reality system and a device for use therein, according to one aspect of the present disclosure, wherein light-emitting devices capable of emitting light in a plurality of unique light patterns, are associated with a tool in the physical reality space, and wherein the detected light pattern is associated with a corresponding unique identity of the tool in the virtual reality space in terms of tool type and tool status;

FIGS. 2A and 2B schematically illustrate one aspect of the tool arrangement shown in FIGS. 1A-1D, wherein the light-emitting devices are provided as a single array or group of lights, and wherein the individual lights in the single array or group are selectively actuatable to provide a plurality of unique light patterns that are associated with a corresponding unique identity of the tool in the virtual reality space;

FIGS. 3A and 3B schematically illustrate another aspect of the tool arrangement shown in FIGS. 1A-1D, wherein the light-emitting devices are provided as two or more separate and discrete groups of lights, and wherein the individual groups of lights are selectively actuatable to provide a plurality of unique light patterns that are associated with a corresponding unique identity of the tool in the virtual reality space; and FIGS. 4A and 4B schematically illustrate yet another aspect of the tool arrangement shown in FIGS. 1A-1D, wherein the light-emitting devices are provided as two or more separate and discrete groups of lights, and wherein one of the individual groups of lights is selectively actuatable to provide a unique light pattern associated with a corresponding unique identity of the tool (tool type) in the virtual reality space, while the other group(s) of lights is selectively actuatable to provide a unique light pattern associated with an operational status (tool status) of the selected tool type.

DETAILED DESCRIPTION OF THE DISCLOSURE

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure are generally directed to a virtual reality system, schematically illustrated as element 100 in FIG. 1A. Such a virtual reality system 100 includes at least an optical detection arrangement 200 configured to detect emitted light as one manner of tracking objects, props or the like 300 in a virtual reality scene 400. Such an optical detection arrangement 200 may be particularly suitable for tracking movable/moving objects, props or the like 300. The light emitted from the objects/props 300 and detected by the optical detection arrangement 200 is subsequently transmitted or otherwise directed to a computer device 500 configured to interpret the detected light and to associate the detected light with an object, prop or the like 300 in the virtual reality scene 400. In this manner, the object, prop or the like 300 can be correlated with a unique identity in the virtual scene or space. For example, the light emitted by the optically-tracked object, prop or the like 300 and detected by the optical detection arrangement 200, may be interpreted by the computer device 500 with a unique identity or tool type, such as a flashlight, a burning torch, or whatever object, prop, or tool envisioned within the virtual scene or space.

In some aspects, the emitted light may be interpreted by the computer device 500 as having other aspects of a unique identity. For example, in addition to a tool type, the emitted light may indicate an operational state or tool status of the optically-tracked object, prop, or tool. For example, if the object, prop or tool is identified as a flashlight (unique identity/tool type—see, e.g., element 250) in the virtual scene or space (see, e.g., FIG. 1A), the emitted light may be further interpreted by the computer device 500 as the flashlight is in an "off" state (e.g., not emitting light) as shown, for example in FIGS. 1A and 1B, or in an "on" state (e.g., emitting light) as shown, for example, in FIGS. 1C and 1D (unique identity/tool status).

In particular aspects, the unique identity may be associated with the light being emitted in a particular light pattern from the optically-tracked object, prop or the like 300. The particular light pattern may be produced, for example, by an array or other arrangement of a plurality of light-emitting devices 600. The light-emitting devices 600 may comprise, for instance, light-emitting diodes (LEDs), incandescent lights, or any other suitable light-emitting element. The light emitted by the light-emitting device 600 may be in the visible spectrum, the infrared spectrum, or any other spectrum of light capable of being detected by the optical detection arrangement 200. Electrical power may be provided to the light-emitting devices 600, as appropriate, by a power source (not shown) engaged with the tool 300. For example, the power source may be a battery, supercapacitor, or any other suitable power source that is preferably rechargeable or, if disposable, easily replaced with respect to the tool 300.

In one particular aspect of the present disclosure, the tool (i.e., the object, prop or the like) 300 having a plurality of light-emitting devices 600 engaged therewith, may be configured such that the light-emitting devices 600 are selectively user-actuatable between a plurality of light patterns detectable by the optical detection arrangement 200. The light patterns, as previously disclosed, provide a corresponding plurality of unique identities of the tool 300 as detected by the optical detection arrangement 200. Accordingly, the tool 300 may further comprise a switching device 350 (see, e.g., FIGS. 1B, 1C, 2A, 2B, 3A, and 3B) operably engaged with the light-emitting devices 600 operably engaged with the tool 300. The switching device 350, for example, may be mounted directly on the tool 300. In other instances, the switching device 350 may be mounted to the user and connected to the tool 300 by wire. One skilled in the art will appreciate, however, that the switching device 350 may be implemented in different manners. For example, the switching device 350 may be embodied as a touch sensitive element included in the tool 300, wherein a change in the grip on the tool 300 by the user may be detected by the touch sensitive element as switching the light-emitting devices 600 from one light pattern to another. In any instance, user-actuation of the switching device 350 thus allows the user to selectively actuate the light-emitting devices 600 between different light patterns so as to change the unique identity of the tool 300. In some aspects, the switching device 350 may be configured for binary operation (i.e., switchable between a first position and a second position for actuating the light-emitting devices 600 between an "off" state and an "on" state), though in other instances, as shown, for example, in FIGS. 2A, 2B, 3A, and 3B, the switching device 350 may comprise a switch having more than two positions (i.e., for switching the light-emitting devices 600 between an "off" state and an "on" state for two or more light patterns).

In some aspects, the light-emitting devices 600 are arranged in an array or a single group of such devices 700 (see, e.g., FIGS. 2A and 2B). In such instances, one or more of the light-emitting devices 600 in the array or the single group 700 is selectively user-actuatable (e.g., by way of the switching device 350) in order to provide the plurality of light patterns associated with the unique identities of the tool 300. In other aspects, the light-emitting devices 600 are arranged in separate groups (e.g., elements 800A, 800B in FIGS. 3A and 3B) of such light-emitting devices. In such instances, each group 800A, 800B having the light-emitting devices 600 therein are engaged with the tool 300, with each group having the light-emitting device 600 arranged in a unique pattern. In such an arrangement, the separate groups are selectively user-actuatable (e.g., by way of the switching device 350) in order to provide the light patterns associated with the unique identities of the tool 300.

In another aspect, as shown, for example, in FIGS. 4A and 4B, a single tool 300 may include two or more discrete groups or patterns 900A, 900B of light-emitting devices 600, wherein each group or pattern of light-emitting devices 600 detected by the optical detection arrangement 200 corresponds to a uniquely identity for the tool 300. For example, if there are two groups 900A, 900B of light-emitting device, one group 900A can be designated a Primary tracked object pattern, while the other group 900B can be designated a Secondary tracked object pattern. The Primary tracked object pattern detected by the optical detection arrangement 200 can uniquely identify the type of object (e.g., tool type) carried by the user (e.g., a flashlight). The Secondary tracked object pattern in a default position is normally powered off. The optical detection arrangement 200 would thus only detect the Primary tracked object pattern. In this situation, the illustrated switching device 350 in the "OFF" position would have both the Primary and Secondary tracked object patterns powered off. Moving the switching device 350 to position "1" would power on the Primary tracked object pattern, providing a first group 900A of light-emitting devices 600 detectable by the optical detection arrangement 200, but the Secondary tracked object pattern would remain powered off (e.g., the default state for the Secondary tracked object pattern). Accordingly, the Primary tracked object pattern detected by the optical detection arrangement 200 would identify the tool type (e.g., a flashlight), but could also identify the tool status (e.g., the lack of detection of the Secondary tracked object pattern indicates that the identified tool type (flashlight) is powered off and not emitting light). Upon the user moving the switching device 350 to position "2," the Secondary tracked object pattern is powered on, providing a second group 900B of light-emitting devices 600 detectable by the optical detection arrangement 200, with the Secondary tracked object pattern being attached to or adjacent the Primary tracked object pattern. Upon the optical detection arrangement 200 detecting the now powered-on Secondary tracked object pattern, the unique identifier provided by the second group 900B of light-emitting devices 600 can be used to indicate many other aspects of the tool 300, as will be appreciated by one skilled in the art. For example, the second group 900B of light-emitting device 600 may uniquely identify a condition (e.g., tool status) of the tool which, in this example, when the Secondary tracked object pattern is detected as being attached to or adjacent the Primary tracked object pattern, would indicate the virtual flashlight being powered on (in contrast to the lack of detecting the second group 900B of light-emitting device 600 indicating that the flashlight is powered off).

One skilled in the art will appreciate that the arrangement of and interaction between the optical detection arrangement 200 and the light-emitting devices 600 in using the various detected light patterns to indicate respective unique identities of the tool 300 may provide an advantage of reducing the complexity of the tracking function associated with the switching device 350 by obviating the need for WiFi, Bluetooth transmitters, or any other wireless data transmission system. In addition, the absence of such wireless transmission equipment reduces power consumption requirements needed to power the tool 300, as compared to, for example, LED lights used as the light-emitting devices 600. Also, by implementing the arrangements disclosed herein, a single representative physical tool 300 (object, prop, or the like) can be used to represent any number of virtual tools in the virtual state in accordance with the number of light patterns capable of being provided by the light-emitting devices 600. Moreover, the disclosed arrangements and aspects of the disclosure provided herein, as will be appreciated by one skilled in the art, to be applicable to many different scenarios relating a physical reality space to a virtual reality space. For example, in some aspects, the object, prop, or the like may comprise the user itself, wherein the light-emitting devices and associated switching device may be physically associated with the user, and wherein switching of the switching device by the user in the physical reality space may in turn change the identity of the user in the virtual space.

Aspects of the present disclosure thus advantageously provide a device for use in a virtual reality system, and an associated virtual reality system, comprising a tool and a plurality of light-emitting devices engaged with the tool and being selectively user-actuatable between a plurality of light patterns each associated with a unique identity. The light patterns are adapted to be detected by an optical detection arrangement, provide a corresponding plurality of unique identities associated with the tool, as detected by the optical detection arrangement. A switching device may be operably engaged with the light-emitting devices, and user-actuatable to selectively actuate the light-emitting devices between the light patterns so as to change the unique identity of the tool, with the unique identities of the tool including a tool type or a tool status.

The switching device incorporated into the tool could be, for example, a mechanical button or switch or any other suitable switching device capable of switching electrical connections between different patterns of light-emitting devices (e.g., LEDs). As such, in the example of the tool/prop being a flashlight, the user could, in the virtual environment, turn the flashlight on and off by actuating a switch incorporated into the tool/prop. Accordingly, instead of trying to detect physical movement of the switch itself, the optical detection arrangement would detect the change in light patterns associated with movement of the switch. Aspects of the virtual reality system and device for use therein thus provide a physical object implementing one or more groups of light-emitting devices that are detectable by an optical detection arrangement, and that are switchable between different unique patterns respectively associated with unique identities in a virtual reality environment, without requiring wireless communication transmitters/receivers, and therefore allow for user and object tracking in a physical environment to be translated into a virtual environment in a simple, efficient, and flexible manner.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A virtual reality system, comprising:
   an optical detection arrangement configured to detect a spatial light pattern emitted by a spatial arrangement of light-emitting devices, each spatial light pattern being associated with a unique identity;
   a tool having the spatial arrangement of light-emitting devices engaged therewith, the light-emitting devices being selectively user-actuatable in a plurality of different combinations, such that each combination of the user-actuated light-emitting devices forms a different spatial light pattern detectable by the optical detection arrangement, and such that the different spatial light patterns as detected by the optical detection arrangement provide a corresponding plurality of unique identities of the tool within the virtual reality system, the unique identities of the tool including a tool type, the light-emitting devices being arranged to form one of the spatial light patterns until being user-actuated tofornn another of the spatial light patterns to indicate a change in the unique identity of the tool within the virtual reality system; and
   a display in communication with the optical detection arrangement and configured to display a virtual image of the tool having the unique identity corresponding to the spatial light pattern detected by the optical detection arrangement.

2. The virtual reality system of claim 1, wherein the tool comprises a switching device operably engaged with the light-emitting devices, the switching device being user-actuatable to selectively actuate the light-emitting devices between the different spatial light patterns so as to change the unique identity of the tool.

3. The virtual reality system of claim 1, wherein the light-emitting devices comprise light-emitting diodes.

4. The virtual reality system of claim 1, wherein the light-emitting devices are arranged in separate groups, each group having the light-emitting devices therein engaged with the tool in a unique spatial pattern, and wherein the groups are selectively user-actuatable to provide the different spatial light patterns.

5. The virtual reality system of claim 1, wherein the light-emitting devices are arranged in an array or a single group, and wherein one or more of the light-emitting devices in the array or the single group is selectively user-actuatable to provide the different spatial light patterns.

6. The virtual reality system of claim 1, wherein the unique identities of the tool include a tool status.

7. A device for use in a virtual reality system, comprising:
   a tool; and a spatial arrangement of light-emitting devices engaged with the tool and being selectively user-actuatable in a plurality of different combinations, such that each combination of the user-actuated light-emitting devices forms a different spatial light pattern adapted to be detected by an optical detection arrangement, with each spatial light pattern being associated with a unique identity, the different spatial light patterns detected by the optical detection arrangement providing a corresponding plurality of unique identities associated with the tool within the virtual reality system, the unique identities associated with the tool including a tool type, the light-emitting devices being arranged to form one of the spatial light patterns until being user-actuated toform another of the spatial light patterns to indicate a change in the unique identity of the tool within the virtual reality system, and the spatial light pattern detected by the optical detection arrangement being adapted to be displayed on a display in communication with the optical detection arrangement as a virtual image of the tool having the unique identity corresponding to the spatial light pattern.

8. The device of claim 7, comprising a switching device operably engaged with the light-emitting devices, the switching device being user-actuatable to selectively actuate the light-emitting devices between the different spatial light patterns so as to change the unique identity of the tool.

9. The device of claim 7, wherein the light-emitting devices comprise light-emitting diodes.

10. The device of claim 7, wherein the light-emitting devices are arranged in separate groups, each group having the light-emitting devices therein engaged with the tool in a unique spatial pattern, and wherein the groups are selectively user-actuatable by a switching device to provide the different spatial light patterns.

11. The device of claim 7, wherein the light-emitting devices are arranged in an array or a single group, and wherein one or more of the light-emitting devices in the array or the single group is selectively user-actuatable to provide the different spatial light patterns.

12. The device of claim 7, wherein the unique identities of the tool include a tool status.

* * * * *